(12) United States Patent
Ezra

(10) Patent No.: US 7,467,804 B2
(45) Date of Patent: Dec. 23, 2008

(54) ANTI-RADIAL TILT DEVICE FOR RECEIVER-TYPE HITCH

(75) Inventor: Brandon Joshua Ezra, 9341 South St. Rd. 39, Winamac, IN (US) 48996

(73) Assignee: Brandon Joshua Ezra, Winamac, IN (US)

( * ) Notice: Subject to any disclaimer, the term of this patent is extended or adjusted under 35 U.S.C. 154(b) by 483 days.

(21) Appl. No.: 11/201,670

(22) Filed: Aug. 12, 2005

(65) Prior Publication Data

US 2007/0052206 A1    Mar. 8, 2007

(51) Int. Cl.
*B60D 1/00* (2006.01)
(52) U.S. Cl. ..................................... 280/506
(58) Field of Classification Search ............ 280/506, 280/504, 491.5, 495; 224/519, 521, 518
See application file for complete search history.

(56) References Cited

U.S. PATENT DOCUMENTS

| | | | | |
|---|---|---|---|---|
| 4,050,714 A | * | 9/1977 | Epp | ............................ 280/495 |
| 5,988,667 A | * | 11/1999 | Young | ......................... 280/506 |
| 6,105,989 A | * | 8/2000 | Linger | ......................... 280/506 |
| 6,131,938 A | * | 10/2000 | Speer | ......................... 280/506 |
| 6,142,502 A | * | 11/2000 | Breslin | ....................... 280/506 |
| 6,942,237 B1 | * | 9/2005 | Depault | .................. 280/491.5 |
| 7,004,491 B1 | * | 2/2006 | Allsop et al. | ................ 280/506 |

* cited by examiner

*Primary Examiner*—Tony H. Winner

(57) ABSTRACT

A device for eliminating radial tilting in a receiver-type hitch due to rotational moment on the shank includes a collar, and three adjustment bolts. The collar has a center bar and a pair of side walls forming a U-shaped bracket that can fit over a reinforcing lip of the hitch receiver tube. A front wall on the collar has an opening for receiving a mount shank as it enters the receiver tube. The three adjustment bolts extend through the center bar to tighten the collar onto the hitch receiver tube. When the center adjustment bolt is tightened, the collar is secured onto the hitch receiver tube. When the adjustment bolts are tightened, the center bar of the collar moves downward away from the receiver tube, causing the opening in the front wall to pull down the shank against the inner wall of the tube and prevent radial tilting within the tube. Therefore, the anti-radial tilt device prevents radial tilting on receiver-type hitch components due to rotational moment created by unbalanced load on a hitch carrier.

6 Claims, 6 Drawing Sheets

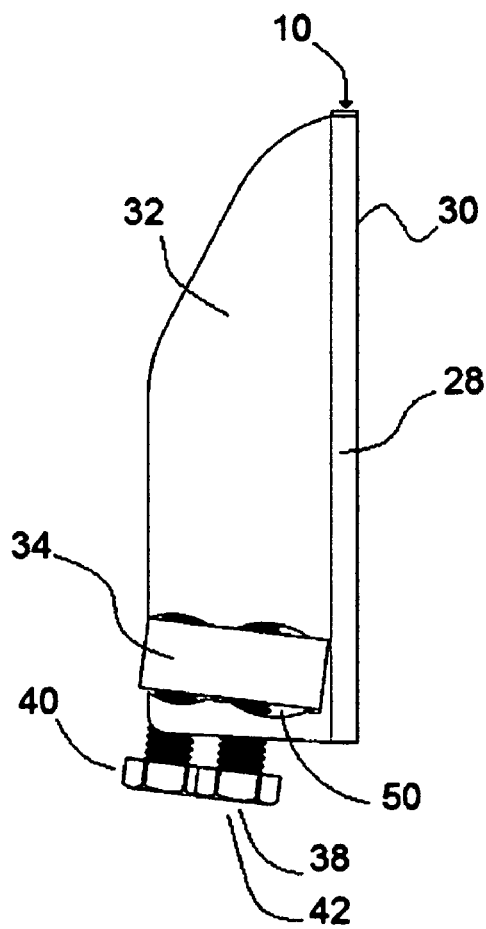
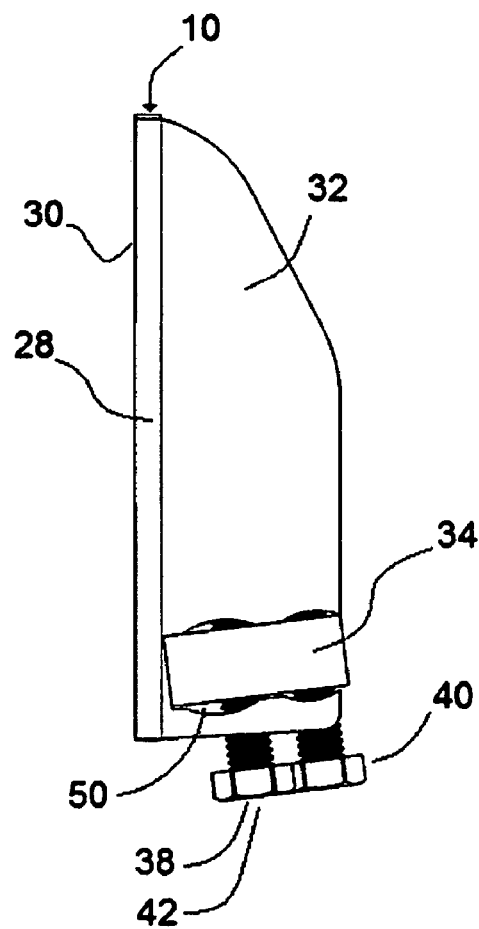

ANTI-RADIAL TILT DEVICE FOR RECEIVER-TYPE HITCH

BACKGROUND OF INVENTION

The present invention relates to securing receiver hitches which are commonly used to mount a trailer to a vehicle or used to secure cargo racks, motorcycle racks, and other devices having a mounting member adapted for insertion into a receiver hitch. Receiver hitches typically include a mount and a receiver tube that can be placed into and removed from the receiver tube. The mount has a shank having a generally square cross-section that fits within the receiver tube. A cross pin is then inserted through the tube and shank to lock the mount to the tube. Clearance must also be provided between the cross pin and corresponding holes in the receiver and shank to facilitate insertion and removal of the cross pin. The receiver tube is slightly larger than the shank to facilitate engagement with the mount shank. Therefore due to unbalanced load on the hitch trailer, and clearance between the shank and receiver, the shank tends to rotate inside the receiver, causing the hitch carrier to radial tilt. The radial tilting of hitch carriers are a common incidence in receiver hitch carriers, due to the unbalanced loads hitch carriers carry, and to the gap between the receiver tube and the shank mount. While various devices may have been proposed to reduce rattling, and may be suitable for the particular purpose those devices address, none of the various devices would be suitable for the purpose of the present invention heretofore described. One known device has a U-shaped collar having a square opening for receiving the tube. The collar slides over the end of the receiver tube and is attached to the tube with one bolt. When that one bolt is tightened the collar constricts the shank mount against the receiver tube reducing the free play movement. While tightening that one bolt may prevent rattling of the shank within the tube, that one bolt acts as a pivot for the shank allowing for the hitch carrier to tilt. An invention would be very favorable, that provides a means to eliminate the radial tilt movement between the shank and hitch receiver tube due to rotational motion created by unbalanced loads. The present invention provides such a device.

SUMMARY OF THE INVENTION

The objective of the present invention is to prevent the radial tilting of unbalanced cargo racks, motorcycle racks, and other devices having a mounting member adapted for insertion into a receiver hitch. Such a device eliminates the rotational moment on the shank by securing its position within a hitch receiver tube. The invention is a device which includes a collar having a front plate with an aperture for receiving the mount shank, side plates and a center bar that contains three threaded throughbores for receiving adjustment bolts. The collar's front and side walls are shaped to fit over a reinforcing lip on the receiver tube, and the center bar is large enough to cover the reinforcing lip completely. When a device such as a hitch carrier is fastening into a vehicle, the mount shank is inserted through the front plate aperture of the collar into the receiver tube. A cross pin is then introduced into the corresponding holes in both the receiver tube and shank to secure the two components together. To hold the shank and receiver tube together with an equally distributed force to prevent radial tilting, three bolts are tightened through the throughbore on the center bar. When the center adjustment bolt is tightened, the collar is secured onto the hitch receiver tube. When the side adjustment bolts are tightened, the center bar of the collar moves downward away from the receiver tube, causing the opening in the front wall to pull down the shank against the inner wall of the tube and prevent radial tilting within the tube. Therefore, the anti-radial tilt device prevents radial tilting on receiver hitch components due to rotational moment created by unbalanced load.

BRIEF DESCRIPTION OF THE DRAWINGS

FIG. 10 is a right side view of the anti-radial tilt device;

FIG. 11 is a left side view of the anti-radial tilt device;

DETAILED DESCRIPTION OF THE PREFERRED EMBODIMENT

Figure 1:
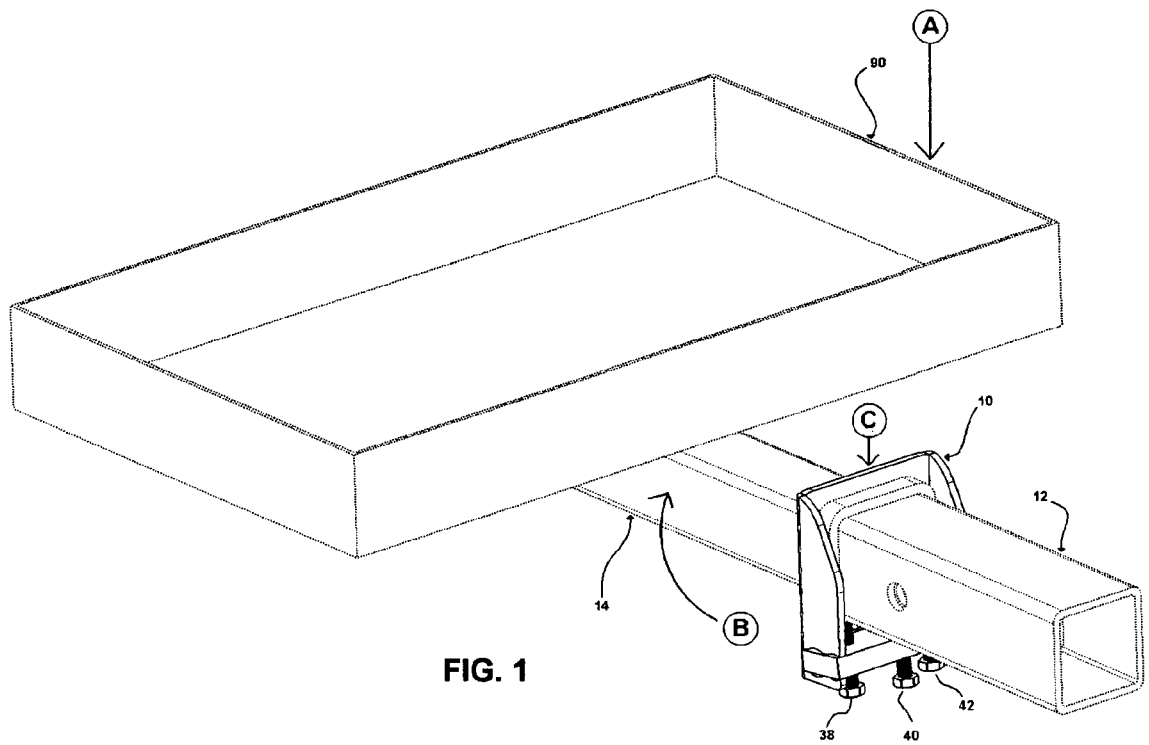
FIG. 1 is a perspective free-body-diagram of the anti-radial tilt device securing the mount shank of a hitch carrier to the receiver tube.
Figure 2:
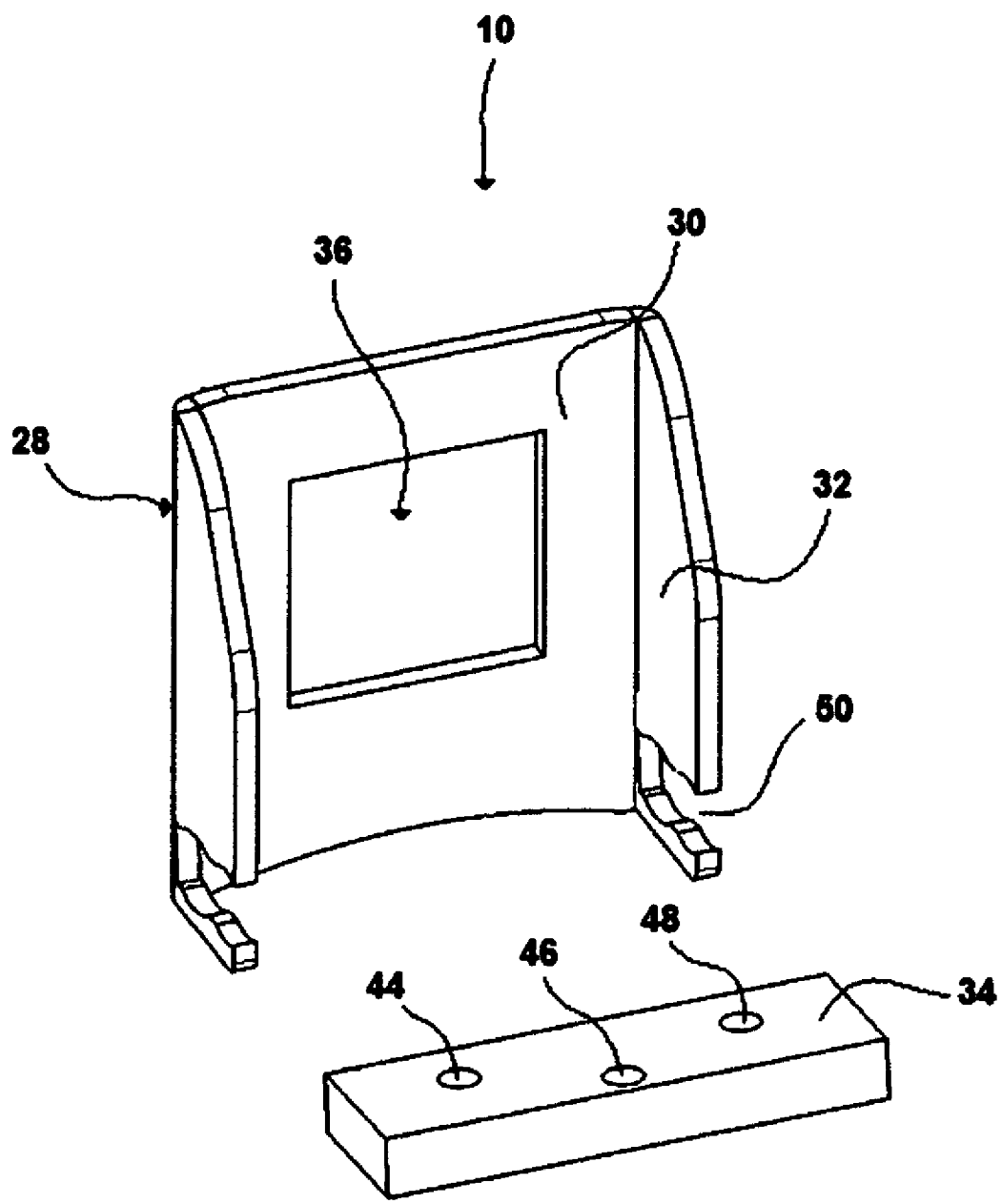
FIG. 2 is an exploded perspective view of the anti-radial tilt device.

With reference now to the various figures in which identical elements are numbered identically throughout, a description of various exemplary aspects of the present invention will now be provided. The preferred embodiments are shown in the drawings and described with the understanding that the present disclosure is to be considered an exemplification of the invention and is not intended to limit the invention to the embodiments disclosed.

The free-body-diagram of demonstrates force A acting on one side of the hitch carrier 90 due to a unbalanced load. Force A generates a rotational moment B on shank 14. If the anti-radial tilt device 10 was not in position, the unbalanced load on the hitch carrier 90 would force both the shank 14 and hitch carrier 90 to tilt. Yet when the anti-radial tilt device is positioned and bolts 38, 40, 42 of the anti-radial tilt device 10 are tightened, the bolts create force C which is distributed along the width of the shank 14. The shank 14 is then subjected to an equal and opposite force as that of the rotational moment B. The net affect of these forces is zero, which means that neither the shank 14 nor hitch carrier 90 will radial tilt.

Figure 3:
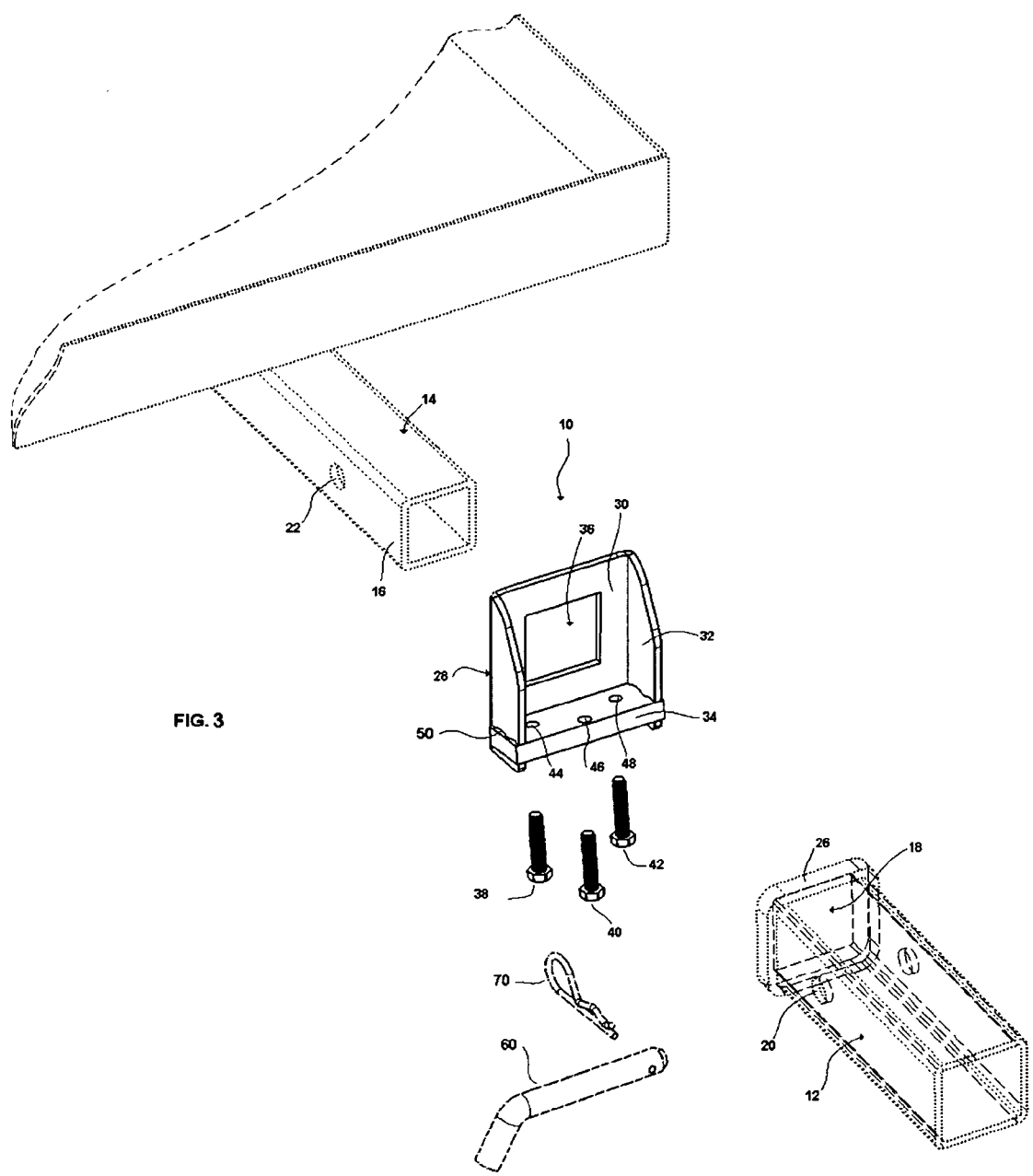
FIG. 3 is an exploded perspective view of the anti-radial tilt device securing the mount shank of a hitch carrier to the receiver tube.
Figure 4:
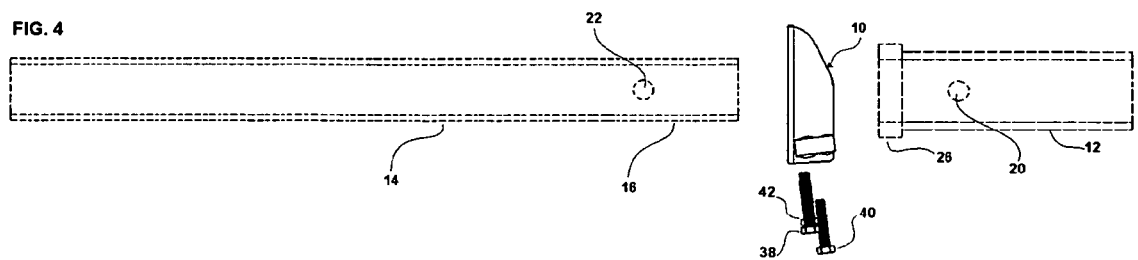
FIG. 4 is a side view of the shank mount, anti-radial tilt device, and receiver tube before assembly.
Figure 5:
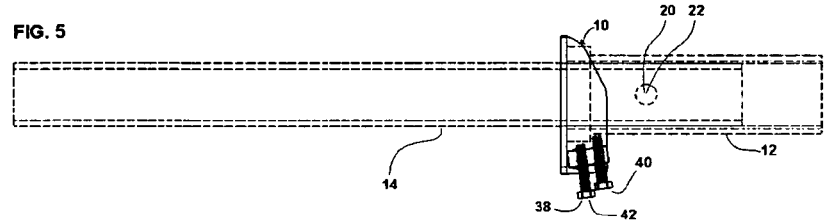
FIG. 5 is a side view of the shank mount, anti-radial tilt device, and receiver tube after assembly.
Figure 6:
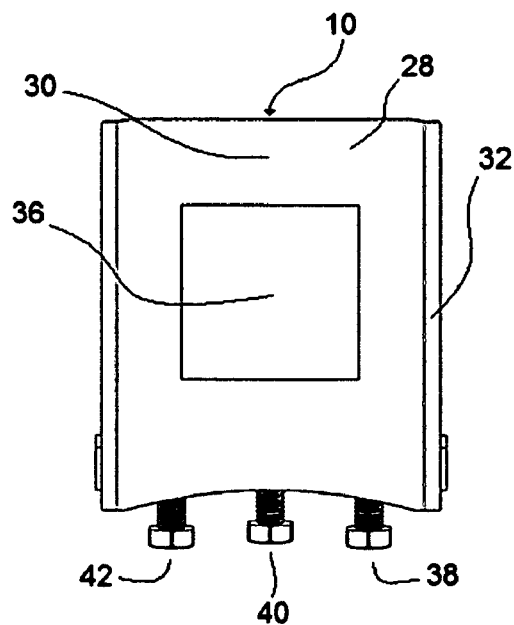
FIG. 6 is a front view of the anti-radial tilt device of the present invention before the hitch is assembled.
Figure 7:
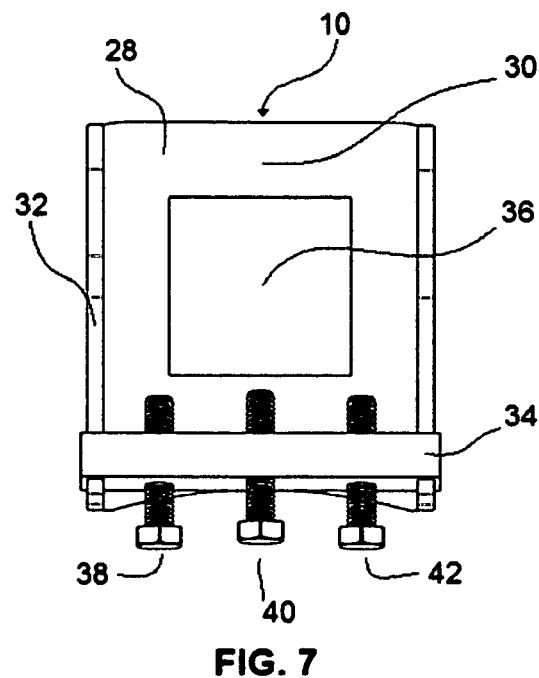
FIG. 7 is a rear view of the anti-radial tilt device.
Figure 8:
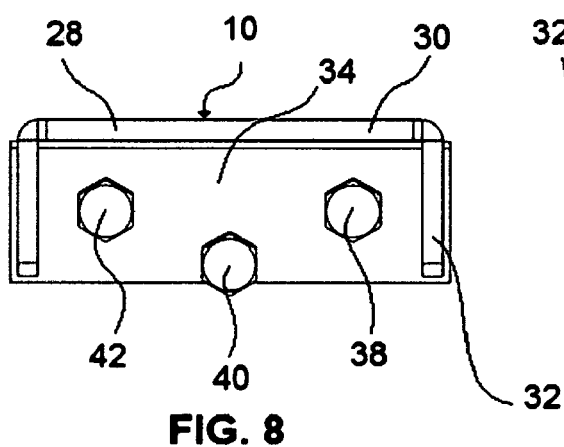
FIG. 8 is a bottom side view of the anti-radial tilt device.
Figure 9:
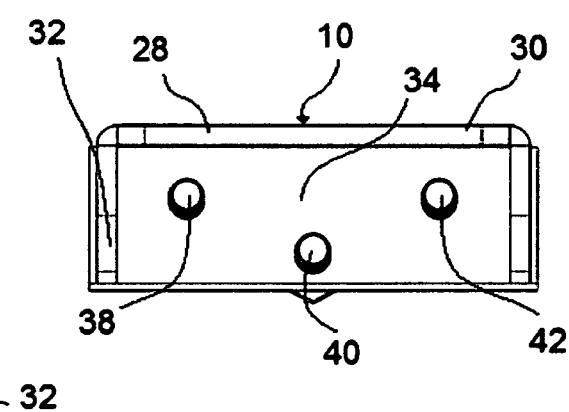
FIG. 9 is a top side view of the anti-radial tilt device.

Referring to FIGS. 3 to 4, an anti-radial tilt device 10 according to the present invention is designed for use with a generally square hitch receiver tube 12 and a mount 14. Mount 14 may include other devices such as motorcycle carriers and cargo carriers. The hitch receiver tube 12 commonly has a square opening 18 for receiving a shank 16 of the mount 14. Both the receiver tube 12 and the shank 16 have matching through holes 22, 20 that line up with each other when the shank 16 is in a proper orientation within the receiver tube 12. The receiver tube 12 is formed of a hard metal, such as steel. The receiver tube 12 has a reinforcing lip 26 disposed around all four sides of opening 18 of the tube 12 for added strength. The reinforcing lip 26 is commonly formed from ¼-inch wide steel strips having a thickness more or less the same to that of the wall thickness of the tube 12.

The reinforcing lip 26 can be fastened to the tube 12 using any known means, such as welding.

Referring to and FIGS. 6 to 11, the anti-radial tilt device 10 contains a collar 28 having a front wall 30, a pair of side walls 32 and a center bar 34. The side walls 32 extend at a right angle to the front wall 30. The front wall 30 has a square opening 36 with proportions that are slightly larger than the dimensions of the shank 16. The opening 36 is larger to allow the shank 16 to pass through the collar 28 and into the receiver tube opening 18. Both the side walls 32 extend at a right angle from opposite sides of the front wall 30. When the center bar 34 has been welded into the notches 50 of the side walls 32, the center bar 34 and side walls 32 form a cover that can slide over the reinforcing lip 26 of the receiver tube 12. The side walls 32 are somewhat narrower than the center bar 34.

As best shown in, the anti-radial tilt device 10 is comprised of the collar 28 the center bar 34, and bolts 38, 40, 42. The U-shaped design of the collar 10 can be formed by laser cutting a sheet of steel to obtain the desired dimensions an then bending the side walls 32 at considerable right angles relative to the front wall 30 into an orthogonal position, In the laser process, opening 36 is cut on the front wall, and notches 50 are cut along the width of the side walls 32. The center bar 34 can be formed by saw cutting a steel bar to dimension and then drilling the three screw holes 44, 46, 48. The center bar 34 is then welded into the notches 50, in an obtuse angle position.

Once the collar 28 is in place on the receiver tube 12, with the opening 36 of the front wall aligned with the opening 18 of the receiver tube, three sides of the receiver tube 12 are covered with the center bar 34 and side walls 32. Openings 36 from the collar and square opening 18 from the receiver tube together receive the shank 16 of the mount 14 as the shank is introduced into the hitch receiver tube 12. The throughbore 46 is positioned on the center bar 34 so that the center adjustment bolt 40 will contact the receiver tube 12 behind the reinforcing lip 26 once the center adjustment bolt 40 is inserted. When the side adjustment bolts 38, 42 are tightened on the center bar 34, the center bar 34 of the collar moves downward away from the receiver tube 12. This motion causes the opening 18 in the front wall 30 to pull down the shank 14 against the inner wall of the tube and prevent radial tilt within the tube, due to rotational moment created by the unbalanced load. The radial tilt-free relationship between the mount shank 16 and the receiver tube 12 is conducted by first placing the collar 28 of the anti-radial tilt device 10 over the reinforcing lip 26 of the receiver tube 12, positioning opening 36 of collar 28 with opening 18 of the receiver mount 12. The shank 16 of mount 14 is then introduced into the receiver tube 12 through collar opening 36 and receiver tube square opening 18. Before the bolts 38, 40, 42 on the center bar 34 may be adjusted the receiver tube mount 12 and the shank 16 need to be held in the proper towing position. In order to hold receiver tube mount 12 and shank 16 in the proper position, a hitch pin 60 is introduced into the through holes 20, 22. The position of hitch pin 60 is then secured in the through holes 20, 22 by a wedged hair pin 70 over the hitch pin.

As shown in, once the mount 14 is secured inside the hitch receiver tube 12, the center bolt 40 of the center bar 34 is adjusted. Tightening the center bolt 40, locks the anti-radial tilt device 10 into position preventing the said device from slipping off the receiver tube. Unbalanced loads on the hitch carrier the shank 16 receives rotational moment, therefore the slight dimensional difference between the receiver tube 12 and the shank 16 allows shank 16 to radial tilt inside the receiver tube 12, allowing the whole hitch carrier to radial tilt. To fasten the shank 16 into place and eliminate the radial tilt, the adjustment bolts 34 and 38 on the center bar 34 can be tightened. The tightening action of adjustment bolts 34 and 38 move the collar 28 downwards away from the receiver tube, causing the opening in the front wall to pull down the shank against the inner wall of the tube creating a uniform force on the shank. This eliminates the radial tilt of the shank within the receiver tube. By using the anti-radial tilt device 10, the radial tilt of the shank within the receiver tube and that of the hitch carrier is eliminated.

Various alternatives to the embodiments of the invention described herein may be employed in practicing the invention. My intention is that the following claims define the scope of the invention and that the methods and apparatus within the scope of these claims and equivalents be covered thereby.

I claim:

1. An anti-radial tilt device for use with a towed hitch vehicle, the device comprising:
   a. a receiver tube having a reinforced lip, said lip positioned at a first end of said tube;
   b. a mount including a shank portion;
   c. a collar including a front wall, a center bar, and side walls, wherein the sidewalls are right angles to said center bar and said front wall;
      i. said center bar located at an obtuse angle to said front wall and having three threaded throughbores;
      ii. said front wall having an opening to receive said mount;
   d. at least two bolts extending through the throughbores and contacting with a reinforced lip;
   e. wherein the at least adjustment bolts are two side bolts movable within the throughbores to move the center bar away from said tube for biasing the opening against said shank portion and forces said shank portion against the inner walls of said tube;
   f. a center bolt, said center bolt extending through the throughbores and locking the tilt device into position by tightening behind of said reinforced lip for counteracting the force created by the side bolts.

2. The device of claim 1, wherein said collar includes two side walls, each extending at a right angle from opposite edges of said front wall.

3. The device of claim 2, wherein said collar is shaped by laser cutting a flat piece of metal, bending the flat piece of metal at right angles to form the side walls, and welding said center bar into the slits along a width of the side walls at an obtuse angle to the front wall.

4. The device of claim 2, wherein said collar is formed by stamping a flat piece of metal, bending the fiat piece of metal at substantially right angles to form the side walls, and welding the center bar into the slits of the side walls.

5. The device of claim 1, wherein said device arranged on said tube such that said bar and bolts are located at a bottom surface of said tube.

6. A system for preventing radial tilting in a receiver hitch assembly, comprising:
  a. a mount having a shank portion;
  b. a receiver tube shaped to receive the shank portion of said mount;
  c. a collar having a front wall, a center bar, and two side walls;
   i. said front wall having an opening to receive the shank portion,
   ii. wherein each of the side walls including a slit extending at a right angle from opposite edges of said front wall
   iii. said bar having three threaded throughbores with both ends welded in the slits of the side walls at an obtuse angle to said front wall;
  d. at least two bolts extending through the throughbores and contacting with a reinforced lip;
  e. wherein the at least adjustment bolts are two side bolts movable within the throughbores to move the center bar away from said tube for biasing the opening against said shank portion and forces said shank portion against the inner walls of said tube;
  f. a center bolt, said center bolt extending through the throughbores and locking the tilt device into position by tightening behind of said reinforced lip for counteracting the forces created by the side bolts.

* * * * *